US006426597B2

(12) United States Patent
Rast et al.

(10) Patent No.: US 6,426,597 B2
(45) Date of Patent: Jul. 30, 2002

(54) CIRCUIT ARRANGEMENT FOR OPERATING GAS DISCHARGE LAMPS

(75) Inventors: Urs Rast, Näfels; Martin Huber, Uster; Felix Tobler, Schänis, all of (CH)

(73) Assignee: Knobel AG Lichttechnische Komponenten, Ennenda (CH)

( * ) Notice: Subject to any disclaimer, the term of this patent is extended or adjusted under 35 U.S.C. 154(b) by 0 days.

(21) Appl. No.: 09/810,413

(22) Filed: Mar. 19, 2001

Related U.S. Application Data

(63) Continuation of application No. PCT/EP99/06085, filed on Aug. 19, 1999.

(30) Foreign Application Priority Data

Sep. 18, 1998 (DE) .......................................... 198 42 853
Apr. 14, 1999 (DE) .......................................... 199 16 878

(51) Int. Cl.[7] .............................................. H05B 37/02
(52) U.S. Cl. ..................... 315/219; 315/224; 315/243
(58) Field of Search ................................ 315/224, 219, 315/243

(56) References Cited

U.S. PATENT DOCUMENTS 4,170,747 A  10/1979  Holmes ...................... 315/307
4,725,762 A  2/1988  Jagschitz .................... 315/216
4,734,624 A  3/1988  Nagase et al. ............... 315/243
5,434,474 A  7/1995  Ukita et al. .................. 315/128
5,742,132 A  4/1998  Huber et al. ................. 315/209

FOREIGN PATENT DOCUMENTS

| DE | 29 36 088 A1 | 4/1980 |
| DE | 36 23 306 A1 | 2/1987 |
| DE | 44 12 518 A1 | 10/1994 |
| EP | 0 314 077 A1 | 5/1989 |
| EP | 0 553 923 A1 | 8/1993 |
| EP | 0 740 492 A2 | 10/1996 |
| GB | 2 319 677 A | 5/1998 |
| WO | 86/04752 | 8/1986 |

*Primary Examiner*—David Vu
(74) *Attorney, Agent, or Firm*—Fitzpatrick, Cella, Harper & Scinto

(57) ABSTRACT

A circuit arrangement comprises four controllable switches (S1, S4) interconnected to form a full bridge. A warm-up operation is carried out in which there is a switch over between the two bridge diagonals (S1, S4; S2, S3) respectively. The gas discharge lamp (EL) is ignited by way of a series resonant circuit (L1, C1) which is coupled to the bridge branch. The actual normal operation is effected by switching over at a low frequency between the switches of the two bridge diagonals (S1, S4; S2, S3), with, moreover, one switch (S1, S2) of the respectively activated bridge diagonal being switched on and off alternately at a high frequency, with this switch (S1, S2) being switched on at the high frequency whenever the current (iL2) flowing by way of the bridge branch has reached a minimum value.

33 Claims, 4 Drawing Sheets

CIRCUIT ARRANGEMENT FOR OPERATING GAS DISCHARGE LAMPS

This is a Continuation of copending International Application No. PCT/EP99/06085, filed Aug. 19, 1999, which was published under PCT Article 21(2) on Mar. 30, 2000 in German but not in English.

BACKGROUND OF THE INVENTION

1. Field of the Invention

The present invention relates to a circuit arrangement for operating gas discharge lamps, in particular high-pressure gas discharge lamps, that is used in electronic ballasts for corresponding gas discharge lamps.

High-pressure gas discharge lamps differ from low-pressure gas discharge lamps inter alia in that they require higher ignition voltages, and their colour temperature changes with the respective lamp power that is supplied. The consequence of the last-mentioned property is that high-pressure gas discharge lamps can only be dimmed with difficulty or cannot be dimmed. On the contrary, in order to maintain the colour temperature of the high-pressure gas discharge lamp, the energy that is supplied to the respective lamp must be kept constant by means of corresponding control. Accordingly, an electronic ballast for high-pressure gas discharge lamps, on the one hand, must generate a high ignition voltage and, on the other hand, must present the possibility of keeping the power supplied to the lamp constant.

2. Description of the Related Art

Known electronic ballasts for high-pressure gas discharge lamps are based on a full-bridge circuit that comprises four controllable electronic switches. This principle shall be explained in the following with reference to FIG. 4, with the circuit that is shown in FIG. 4 being known, for example, from WO-A-86/04752.

As has already been mentioned, this known circuit, for the purpose of activating a gas discharge lamp EL, in particular a high-pressure gas discharge lamp, comprises a full bridge that has four controllable switches S1–S4 which are formed, in accordance with the previously mentioned printed specification, in particular by means of bipolar transistors. Connected in the bridge branch of this full bridge there is a series resonant circuit consisting of a coil L1 and a capacitor C1, with the gas discharge lamp EL that is to be activated being arranged in parallel with the capacitor C1. The full bridge is fed with a direct voltage $U_0$. Connected in parallel with the switches or transistors S1–S4 there are freewheeling diodes, although these are not shown in FIG. 4 for the sake of simplicity. In order to operate the gas discharge lamp EL, in WO-A-86/04752 it is proposed that during a first operating phase the switch S4 be closed and the switches S2 and S3 be opened. Furthermore, during this first operating phase the switch S1 is switched on and off alternately at a high clock frequency. During the on-period of the switch S1 a direct current flows by way of the switch S1, the coil or inductor L1, the gas discharge lamp EL and the switch S4 which is continuously closed during this operating phase. By opening the transistor S1 the flow of current is interrupted and the magnetic energy previously built up in the coil L1 as a result of the flow of current is converted into electrical energy that supplies a counter-voltage which maintains the flow of current through the gas discharge lamp EL in the same direction until the next time the switch S1 is switched on, with the energy that is stored in the coil L1 thereby being reduced. By switching on the switch S1 again, the electric circuit previously described is closed again so that the process mentioned above is repeated. During this first operating phase in which the switches S2 and S3 are permanently open and the switch S4 is permanently closed and the switch S1 is opened and closed alternately at a high frequency, the current flows through the gas discharge lamp EL continuously in the same direction. This results in the gas discharge lamp EL flickering less during the operation thereof and a higher level of luminous efficiency is possible. During permanent operation with the direct voltage $U_0$, however, it is possible that deposits will accumulate in the electrode region of the gas discharge lamp EL, caused by the flow of electrons flowing continuously in the same direction. In order to avoid these deposits, the polarity of the gas discharge lamp EL is repeatedly reversed at a low frequency. This is effected in that during a second operating phase the switches or transistors S1 and S4 are now permanently open and the switch S3 is permanently closed. Furthermore, during this second operating phase the switch S2 is switched on and off alternately at a high frequency so that in principle the same mode of operation ensues as that which ensues during the first operating phase previously described, although during the second operating phase the flow of current through the gas discharge lamp EL is reversed.

In summary it can accordingly be established that the full bridge shown in FIG. 4 in principle is operated with the direct voltage $U_0$, although as a result of the low-frequency polarity-reversal between the bridge diagonals S1–S4 or S2–S3 respectively, that is, as a result of the low-frequency switch-over between the two first and second operating phases previously described, a low-frequency alternating current, the frequency of which current corresponds to the frequency of polarity-reversal, is supplied to the gas discharge lamp EL and the inductor L1. During the two operating phases, either the switch S1 or the switch S2 is switched on and off alternately at a high frequency.

The ratio of magnitudes between the clock frequency, with which the switches S1 or S2 are alternately switched on and off, and the clearly lower frequency of polarity-reversal should be selected so as to be as large as possible and can amount, for example, to 1000:1. The greater this ratio is, the smaller the dimensions of the inductor or coil L1 can be. On account of the high-frequency switch-over of the switches S1 or S2 respectively, a correspondingly high-frequency current is generated that flows through the inductor L1. The inductor serving to limit the lamp current can therefore have smaller dimensions than in the case where a low-frequency current flows through The ignition of the gas discharge lamp EL that is shown in FIG. 4 is effected with the aid of the series resonant circuit that is formed by the inductor L1 and the capacitor C1, in which case for ignition purposes it is necessary to operate the gas discharge lamp EL at a frequency that lies close to the resonant frequency of the series resonant circuit. If this is the case, a voltage overshoot occurs at the gas discharge lamp EL leading to the ignition of the gas discharge lamp.

A similar circuit arrangement for igniting and operating a gas discharge lamp, in particular a high-pressure gas discharge lamp, is known from EP-A2-0740 492. For the purpose of igniting or operating the gas discharge lamp it is proposed in this printed specification that with the aid of a corresponding control circuit the switches S1, S4 or S2, S3 of the full bridge that are arranged in the bridge diagonals be controlled during a first operating phase in a complementary manner at a comparatively high frequency until the gas discharge lamp ignites. Subsequently, the control circuit switches over into a second operating phase (nominal operating phase) in which the control circuit activates the switches S1–S4 of the full-bridge arrangement in a complementary manner at a comparatively low frequency. Moreover, according to this printed specification a regulating device is used that is coupled on the output side by way of a capacitor to the full bridge in such a way that the full bridge is arranged parallel to the capacitor. The regulating device is used, moreover, to supply voltage to the full bridge and regulates in particular the power that is supplied to the gas discharge lamp. To this end, the voltage that is applied to the output terminals of the regulating device and also the instantaneously flowing current are measured, the corresponding values are multiplied and the actual value formed is supplied as the actual value of the lamp power of the regulating device. The control circuit previously mentioned is connected to the regulating device and presets the rated value of the output power of the regulating device, with the control circuit raising the rated value in particular during the first operating phase described above (start-up operating phase) so that the regulating device can supply a higher output power to the full bridge. The gas discharge lamp can be ignited by means of an ignition device which is coupled to the inductor L1 arranged in the bridge branch. Alternatively, the gas discharge lamp can be ignited by means of the use of the capacitor C1 that is shown in FIG. 4 and which is connected in parallel with the gas discharge lamp EL and which together with the inductor L1 forms a series resonant circuit.

A further circuit arrangement for igniting and operating gas discharge lamps, in particular highpressure metal halide gas discharge lamps, that is known from GB-A-2319 677, is shown in FIG. 5. This circuit arrangement also comprises four switches S1–S4 that are interconnected to form a full bridge and which can be formed by means of bipolar transistors or field-effect transistors. Located in the bridge branch of this full-bridge circuit there is a gas discharge lamp EL as well as a series resonant circuit formed by an inductor L1 and a capacitor C1. In order to start, that is, ignite the gas discharge lamp EL, with the aid of a corresponding control circuit which can activate the individual switches S1–S4 individually by way of corresponding bridge drivers the full bridge is operated at a comparatively high frequency which can lie in the range of 20–40 kHz. This high frequency is selected in particular in such a way that it lies close to the resonant frequency of the series resonant circuit, consisting of the inductor L1 and the capacitor C1, so that the gas discharge lamp EL ignites after a certain time. The ignition of the gas discharge lamp EL can be detected, for example, by monitoring the lamp current or by monitoring the lamp brightness. As soon as the ignition of the gas discharge lamp EL has been detected, the full bridge is switched over to a low operating frequency, which can lie in particular in the range of 50–200 Hz, in order to operate the lamp. As can be inferred from FIG. 5, moreover the circuit arrangement that is known from this printed specification comprises a transformer which is termed an ignition transformer or autotransformer, the primary winding L2 of which is arranged in series with the capacitor C1 of the series resonant circuit, whilst the secondary winding is connected in series with the gas discharge lamp EL. In the event of the occurrence of a flow of current through the capacitor C1 (this being the case in particular when the high ignition frequency is applied), this transformer with the inductors L2 and L3 is used to generate an increased voltage in the secondary coil L3 that is applied to the gas discharge lamp EL. In this way, the ignition and also the operation of the gas discharge lamp EL can be facilitated.

The circuit arrangement shown in FIG. 5 in which an autotransformer is used, the primary winding L2 of which is connected in series with the series resonant circuit capacitor C1 and the secondary winding L3 of which is connected in series with the gas discharge lamp EL, does, however, have the disadvantage that a ripple current flowing through the full bridge is also stepped up and accordingly has a negative effect upon the lamp current. Whilst the circuit arrangement that is known from EP-A2-0740 492 and which has also been discussed previously does make it possible to regulate, or keep constant, the power that is supplied to the full bridge, a comparatively large number of components are required for this so that the circuit arrangement is comparatively complex and expensive.

SUMMARY OF THE INVENTION

The underlying object of the present invention is therefore to propose an improved circuit arrangement for igniting or operating gas discharge lamps, in particular high-pressure gas discharge lamps, that avoids the problems previously described. In particular, a circuit arrangement is to be proposed which, on the one hand, makes it possible to keep the power supplied to the lamp constant, yet, on the other hand, manages to do this with fewer components than the circuit arrangement that is known from EP-A2-0740 492 and accordingly is less expensive to realize. In addition, the circuit arrangement in accordance with the invention is to enable there to be reliable ignition of the gas discharge lamp, because in particular after ignition it is to be guaranteed that the lamp current is not affected in a disturbing manner.

The object previously mentioned is achieved in accordance with the present invention by means of a circuit arrangement that in one aspect comprises four controllable switches arranged in a full bridge circuit to which a direct voltage is applied. The first switch is connected in series with the second switch and the third switch is connected in series with the fourth switch. In addition, the first switch is connected to the third switch and the second switch is connected to the fourth switch. The bridge circuit has a bridge branch in which a gas discharge lamp may be connected and which connects a nodal point between the first and second switches to a nodal point between the third and fourth switches. A control circuit is provided to switch over between first and second states at a first frequency during normal operation of the gas discharge lamp. The first state causes the first and fourth switches to be open, the second switch to be switched on and off (closed and open) at a second frequency which is higher than the first frequency, and the third switch to be closed, at least when the second switch is closed. The second state of the control circuit causes the second and third switches to be open, the first switch to be switched on and off at the second frequency and the fourth switch to be closed, at least when the first switch is also closed. The control circuit monitors a branch current flowing in the bridge branch so that whenever the branch current reaches a minimum value during the first state the control circuit closes the second switch or whenever the branch current reaches a minimum value during the second state, the control circuit closes the first switch.

In a second aspect, the control circuit is configured such that, during a warm up phase, the control circuit alternately switches over between a first state and a second state at the first frequency. During the first state, the first and fourth switches are open and the second and third switches are switched on and off together at a second frequency which is higher than the first frequency; and during the second state, the second and third switches are open and the first and fourth switches are switched on and off together at the second frequency.

In a third aspect, a series resonant circuit is coupled to the bridge branch and the control circuit is arranged to cause ignition of the gas discharge lamp. During the igniting operation, and before normal operation of the lamp, the control circuit operates the full bridge at a frequency that lies close to the resonant frequency of the series resonant circuit. Also, in this third aspect, the bridge circuit is configured such that during the igniting operation, it opens the first and second switches and switches the first and fourth switches on and off alternately at a frequency that lies close to the resonant frequency of the series resonant circuit.

Additional features of the invention are described and claimed herein. The subclaims, in each case, describe preferred and advantageous embodiments of the present invention.

According to the first aspect of the invention, the gas discharge lamp is operated in a manner analogous to the known prior art with a full-bridge circuit in such a way that there is a switch-over between the two bridge diagonals at a comparatively low frequency, with respectively the switches of the one bridge diagonal being switched on and the switches of the other bridge diagonal being switched off. In addition, at least one switch of the activated bridge diagonal is switched on and off alternately at a comparatively high frequency, with in accordance with the present invention this switch that is switched at a high frequency being closed continuously when the branch current that flows by way of the bridge branch of the full bridge has reached a minimum, that is, a lower reversal point. This switch that is switched at a high frequency can be opened at random, with the time of the opening regulating in particular the power that is supplied to the gas discharge lamp. Switching on the switch that is switched at a high frequency at the lower reversal point of the current that flows by way of the bridge branch and which in particular lies close to the current value zero makes it possible for the switch that is in each case switched at a high frequency to be treated gently since almost zero power is supplied to it at this instant. Furthermore, on account of this measure it is also possible to use, as controllable switches of the full bridge, field-effect transistors with integrated free-wheeling diodes with which a comparatively long time span is required in order to clear the electrons from the barrier layer of the respective free-wheeling diode. However, such field-effect transistors are significantly less expensive than those field-effect transistors that are also on the market and have comparatively short clearance times, such as, for example IGBT's, so that the circuit arrangement in accordance with the invention manages with less expensive components. In accordance with a further development of the invention, the lowering of the current flowing in the bridge branch can be accelerated in part in that, in addition to the switch that is switched at a high frequency, the second switch of the activated bridge diagonal is also opened after a predetermined period of time.

The branch current flowing in the bridge branch of the full bridge is monitored in particular with the aid of an inductor which is connected into the bridge branch and which is part of a series resonant circuit that is coupled, in the bridge branch, to the gas discharge lamp that is to be controlled. The lower reversal point of the branch current can be determined by means of inductive coupling with this inductor. The instantaneous level of the branch current flowing through this inductor can be determined by way of a shunt resistor that is coupled to the full bridge.

After the ignition and before normal operation of the gas discharge lamp in accordance with a warm-up phase is effected. It is a known property of high-pressure gas discharge lamps that the latter behave in a manner that is comparatively difficult to control and in an unstable manner until they have been fully heated to the operating temperature. The full rise in temperature occurs after approximately one to two minutes. During the heating phase (with a lamp voltage of approximately 20 volts), the voltage applied to the gas discharge lamp is less than it is during normal operation (with a lamp voltage of approximately 80–90 volts). If the electronic ballast or the circuit arrangement were operated in the warm-up phase as it is during normal operation, this would result in less lamp current flowing byway of the inductor that is located in the bridge branch so that, if need be, no reliable information can be given on the branch current previously mentioned. For this reason, in accordance with the present invention it is proposed that during the warm-up phase the switches of the two bridge diagonals be switched on and off at a high frequency. At the end of the warm-up phase, a switch-over to the normal operation previously described then takes place.

In order to ignite the gas discharge lamp it is proposed that two switches that are coupled together and which are arranged in different bridge diagonals of the full bridge be opened, whilst the other switches are opened and closed alternately at a high frequency. This high frequency, at which the two switches last mentioned are alternately opened and closed, is selected in particular in such away it lies close to the resonant frequency of the series resonant circuit that is arranged in the bridge branch of the circuit arrangement in accordance with the invention so that the gas discharge lamp that is to be activated can be reliably ignited. In the case of the present invention as well an autotransformer is used, although the inductor of the series resonant circuit is used for this and the capacitor of the series resonant circuit acts on a tapping point of this inductor. In this way, the voltage that drops across the one coil half is stepped up with respect to the coil half on the lamp side so that an increased ignition voltage can be realized for the gas discharge lamp.

During the low-frequency operation of the circuit arrangement previously described, taking place, for example, at switching frequencies between 80–150 Hz, a humming noise inevitably results. The humming noise at this low frequency is comparatively quiet per se and not very disturbing. On the other hand, the harmonics that are generated by the steep edges at the switchover instants, do have a disturbing effect. For this reason, in accordance with a preferred exemplary embodiment it is proposed that these switch-over edges be configured so as to be flatter, in which case this is realized in particular by reducing the current peaks of the branch current flowing in the bridge branch before and after the switch-over. This reduction in the current peaks can be effected, for example, by adapting the control circuit of the circuit arrangement in terms of its hardware or software.

BRIEF DESCRIPTION OF THE DRAWINGS

The present invention is described in greater detail in the following with the aid of preferred exemplary embodiments and with reference to the enclosed drawing, in which.

DETAILED DESCRIPTION OF THE PREFERRED EMBODIMENTS

Figure 1:
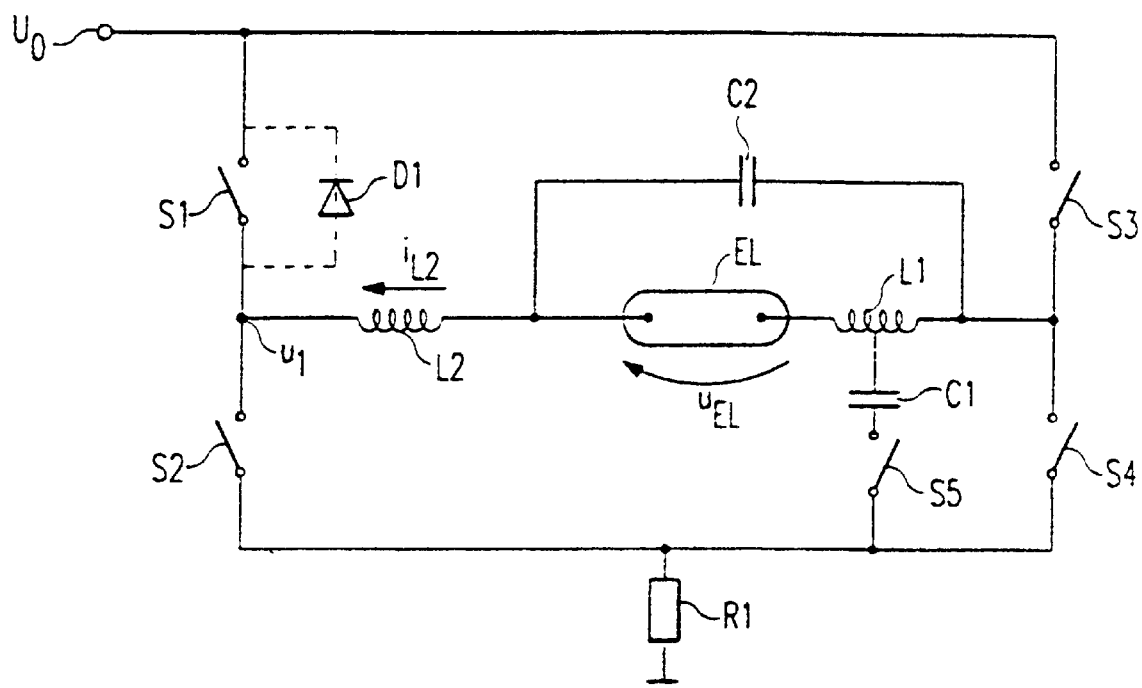
FIG. 1 shows a circuit diagram of a circuit arrangement in accordance with the invention in accordance with a preferred exemplary embodiment of the present invention.

The circuit arrangement shown in FIG. 1 comprises controllable switches S1–S4 which are interconnected to form a full bridge. A direct voltage $U_O$, which originates from a suitable direct-voltage source of the corresponding electronic ballast in which the circuit arrangement is used, is applied to the full bridge. Connected in parallel with the switches S1–S4 there are respective free-wheeling diodes, with merely the free-wheeling diode D1, which is connected in parallel with the switch S1, being shown in FIG. 1 for the sake of simplicity. Field-effect transistors that already contain the free-wheeling diodes are preferably used as the switches S1–S4. Arranged in the bridge branch of the full bridge shown in FIG. 1 there is a gas discharge lamp EL, in particular a high-pressure gas discharge lamp, which is to be activated. The circuit arrangement shown in FIG. 1 is suitable in particular for the operation of high-pressure metal halide gas discharge lamps that require particularly high ignition voltages. As has already been mentioned at the beginning, high-pressure gas discharge lamps differ from low-pressure gas discharge lamps in particular in that they require higher ignition voltages and a higher pressure occurs in their smaller lamp body. Furthermore, high-pressure gas discharge lamps have a higher level of luminance, although the colour temperature of the respective high-pressure gas discharge lamp changes with the power that is supplied thereto. Electronic ballasts for high-pressure gas discharge lamps should therefore, on the one hand, make high ignition voltages available and, on the other hand, make it possible to keep the power that is supplied constant.

Coupled to the bridge branch of the full bridge shown in FIG. 1 there is a series resonant circuit which comprises an inductor L1 and a capacitor C1, with the capacitor C1 acting on a tapping point of the inductor L1 and being connected in parallel with the switch S4 by way of a further controllable switch S5. In addition, a smoothing or filter circuit is provided that has a further inductor L2 and a further capacitor C2, with these components being interconnected in the manner that is shown in FIG. 1. Moreover, a resistor R1, which is used as a current-measuring or shunt resistor, is connected to the full bridge.

The series resonant circuit previously mentioned with the inductor L1 and the capacitor C1 is used in combination with the further capacitor C2 in particular to ignite the gas discharge lamp EL. To this end, the series resonant circuit is excited to resonate, that is, a frequency that corresponds to the resonant frequency is supplied to the lamp. The excitation of the resonant circuit is effected by alternately switching the switches S3 and S4. This shall be explained in greater detail in the following.

In order to ignite the gas discharge lamp EL, two switches, which are connected directly in series, for example the switches S1 and S2, are opened with the aid of a suitable control circuit, and the switch S5, which is in series with the capacitor C1, is closed. The other two switches, for example the switches S3 and S4, of the full bridge are opened and closed alternately, with this being effected at a comparatively high frequency (approximately 150 kHz). The switching frequency is slowly lowered in the direction of the resonant frequency of the series resonant circuit that is formed by the inductor L1 and the capacitor C1. The ignition voltage of the gas discharge lamp EL is as a rule already reached before the resonant frequency is reached. In this case, the switching frequency for the switches S3 and S4 is kept at this frequency until the lamp EL ignites. On account of the autotransformer principle realized by the inductor L1, the voltage that drops across the right-hand half of L1 is stepped up, for example in the ratio of 1:15, with respect to the left-hand half which is coupled to the gas discharge lamp EL, with the voltage that occurs across the left-hand half of the inductor L1 establishing the actual ignition voltage for the gas discharge lamp EL that is applied to the lamp by way of the capacitor C2. In order to detect the ignition of the gas discharge lamp EL, the voltage is measured that drops across the tapping point of the inductor L1 and which is proportional to the ignition voltage or lamp voltage $u_{EL}$, since after the ignition of the lamp EL this has a damping effect upon the series resonant circuit. After ignition of the gas discharge lamp EL has taken place, the switch S5 is opened for the subsequent normal operation.

It is to be additionally noted that the switch S5 is not absolutely necessary for the operability of the circuit arrangement in accordance with the invention. On the contrary, the switch S5 could also remain closed after ignition of the gas discharge lamp EL has taken place or in principle be replaced by a corresponding bridge. With the aid of the switch S5, which is opened after ignition of the gas discharge lamp EL has taken place, however, it is possible for the gas discharge lamp EL to be operated more neatly. Furthermore, it is to be noted that the ignition coil L1 is designed in particular in such a way that during the normal operation, which is explained further in greater detail in the following, it operates at saturation point and thus does not affect the rest of the circuit. This can be achieved, for example, in that as the ignition coil L1 a coil is used that has an iron core and which is operated at saturation point during normal operation so that after the ignition of the gas discharge lamp EL the coil L1 merely establishes negligible inductance during normal operation. During normal operation merely the inductor L2, which is also provided in the bridge branch, is thus effective in a current-limiting manner.

The normal operation that is initiated after the ignition of the gas discharge lamp EL, in which case during normal operation the circuit arrangement in accordance with the invention, or full bridge, is operated in a so-called discontinuous mode, shall now be explained in greater detail in the following.

Basically, the full bridge that is shown in FIG. 1 is operated with the controllable switches S1–S4 in a manner known per se during the normal operation, that is, the two bridge diagonals with the switches S1 and S4 or S2 and S3 respectively are activated and deactivated alternately and thus the corresponding switches of the two bridge diagonals are switched on and off alternately or in a complementary manner with respect to each other, in which case, moreover, in the case of activation of the bridge diagonal with the switches S1 and S4 the switch S1 is switched on and off alternately at a high frequency, whilst in a corresponding manner in the case of activation of the bridge diagonal with the switches S2 and S3 the controllable switch S2 is switched on and off alternately at a high frequency. This means that the polarity of the full bridge is reversed at a comparatively low frequency which can lie in particular in the range of 80–150 Hz, whilst the switch S1 or S2 of the respectively activated bridge diagonal, moreover, is switched on and off alternately at a high frequency, for example at a frequency of approximately 45 kHz. Switching the switches S1 or S2 on and off at a high frequency in this way is effected with the aid of a high-frequency pulse-width modulated control signal of a corresponding control circuit that is filtered with the aid of the filter or smoothing circuit that consists of the components L2 and C2 so that merely the linear mean value of the branch current $i_{L2}$ flowing by way of the bridge branch is applied to the gas discharge lamp EL. With the aid of the pulse-width modulated control signal it is possible for the power that is supplied to the full bridge to be kept constant, something which—as mentioned at the beginning—is important in particular for the operation of high-pressure gas discharge lamps. The low-frequency component of the current that is supplied to the gas discharge lamp EL is generated by switching over or reversing the polarity of the two bridge diagonals, that is, by switching over from S1 and S4 to S2 and S3. By way of the right-hand bridge branch with the switches S3 and S4 in this case the lamp EL is connected to the supply voltage $U_0$ or to ground at a low frequency so that substantially merely the low-frequency component is applied to the terminals of the lamp EL.

In accordance with the low-frequency discontinuous mode previously mentioned, the controllable switch S1 or S2 of the respectively activated bridge diagonal is closed whenever the branch current $i_{L2}$ flowing by way of the inductor L2 has reached its minimum. The lower reversal point of the current $i_{L2}$ is understood by "minimum", with it being quite possible as well for this minimum to lie in the slightly negative current-value range.

In order to examine the current characteristic $i_{L2}$ in the following considerations shall be based on the fact that in the first instance the bridge diagonal with the switches S2 and S3 is activated, whilst the bridge diagonal with the switches S1 and S4 is deactivated. This means that the switches S2 and S3 are closed, whilst the switches S1 and S4 are open. At the time of closure of the switches S2 and S3, a current $i_{L2}$, which rises in accordance with an exponential function, starts to flow through the inductor L2, in which case in the range of interest here a quasi-linear rise of the current $i_{L2}$ can be identified so that for the sake of simplicity in the following there will be talk of a linear rise or fall of the current $i_{L2}$. By opening the switch S2, this current $i_{L2}$ is interrupted, with—as has already been mentioned—the switch S2 being opened and closed alternately in particular at a high frequency and irrespective of the switching state of the switch S3. The consequence of opening the switch S2 is that whilst the current $i_{L2}$ first of all flows on in the same direction by way of the free-wheeling diode D1 of the opened switch S1, it decreases continuously and finally can even reach a negative value. This is the case in particular for so long until the electrons have been cleared from the barrier layer of the free-wheeling diode D1. The attainment of this lower reversal point of the current $i_{L2}$ is monitored and the switch S2, after identification of this lower reversal point, is closed again so that the current $i_{L2}$ rises again. This means that switching on the switch S2 at a high frequency takes place whenever the lower reversal point of the current $i_{L2}$ has been reached. In principle the switch S2 can be opened at random, with the time of the opening of the switch being particularly crucial for the supply of power to the gas discharge lamp EL so that by suitable adjustment of the opening time it is possible to regulate, or keep constant, the power that is supplied to the lamp. The time or the maximum value of the branch current $i_{L2}$ can be used, for example, for this as a switching criterion.

As a result of the measure of switching the respective switch S1 or S2, which is switched on and off alternately at a high frequency, back on in each case at the lower reversal point of the current $i_{L2}$, that is, close to the current value zero, the respective field-effect transistor S1 or S2 is treated gently, that is, protected from being destroyed, and it is possible to use as switches S1 and S2 field-effect transistors that have comparatively long clearance times for the corresponding free-wheeling diode. This shall be explained in greater detail in the following.

Before the switch S2 is closed, a voltage is applied across it amounting to approximately 400 volts in the present case. If the switch S2 is closed, this voltage collapses, that is, it drops very quickly from 400 volts to 0 volts. The special property of a field-effect transistor, however, is that the current already starts to flow in the event of activation of the corresponding field-effect transistor before the corresponding voltage has dropped to 0 volts. In this short time segment between the rise of the current flowing for the field-effect transistor and the attainment of the voltage 0 volts, the product of the current and the voltage produces a power that is supplied to the respective field-effect transistor and which can destroy the field-effect transistor. It is therefore advantageous to switch the field-effect transistor when there is the smallest possible flow of current, in particular when close to the current value zero.

Furthermore, it is to be noted that the current $i_{L2}$ that flows by way of the inductor L2 flows by way of the free-wheeling diode of D1 when the switch S1 is open and the switch S2 is still open as well. If the switch S2 is closed and the switch S1 is open, it takes a specific amount of time until the electrons can be cleared out of the barrier layer of the free-wheeling diode D1. During this time, the field-effect transistor S1 is practically in a conductive state. This means that during a comparatively short time span, until the barrier layer of the free-wheeling diode D1 associated with the field-effect transistor S1 is cleared, the field-effect transistor S2 is at the full operating voltage $U_0$ which amounts to approximately 400 volts, whereby the overloading previously described and, if applicable, even destruction of the field-effect transistor S2 can likewise result. By virtue of the procedure previously proposed, namely switching on the switch S2 whenever the current $i_{L2}$ flowing by way of the inductor L2 has reached its minimum, the effect previously described with reference to the clearance time of the switch or field-effect transistor S1 is almost insignificant so that even field-effect transistors that have comparatively long clearance times for the free-wheeling diodes connected therewith can be used for the switches S1–S4. Whilst there are already switching elements that have very short clearance times, such as, for example, the so-called IGBT (Insulated Gate Bipolar Transistor), these components are very expensive. The present invention thus makes it possible to dispense with the use of such expensive components.

For the procedure previously described it is necessary for the instantaneous value of the current $i_{L2}$ and also the time at which its reversal point is reached to be known. The instantaneous value of the current $i_{L2}$ can be determined, for example, by measuring the voltage that drops across the resistor R1. The lower reversal point of the current $i_{L2}$ is preferably determined by means of a voltage that is tapped in the manner of a transformer at the coil L2. To this end, a winding or coil (not shown in FIG. 1) can be coupled in the manner of a transformer to the coil L2 leading to a differentiation in the current $i_{L2}$ flowing by way of the coil L2 and thus permitting information to be given on the reversal point of the current $i_{L2}$.

Figure 2A:
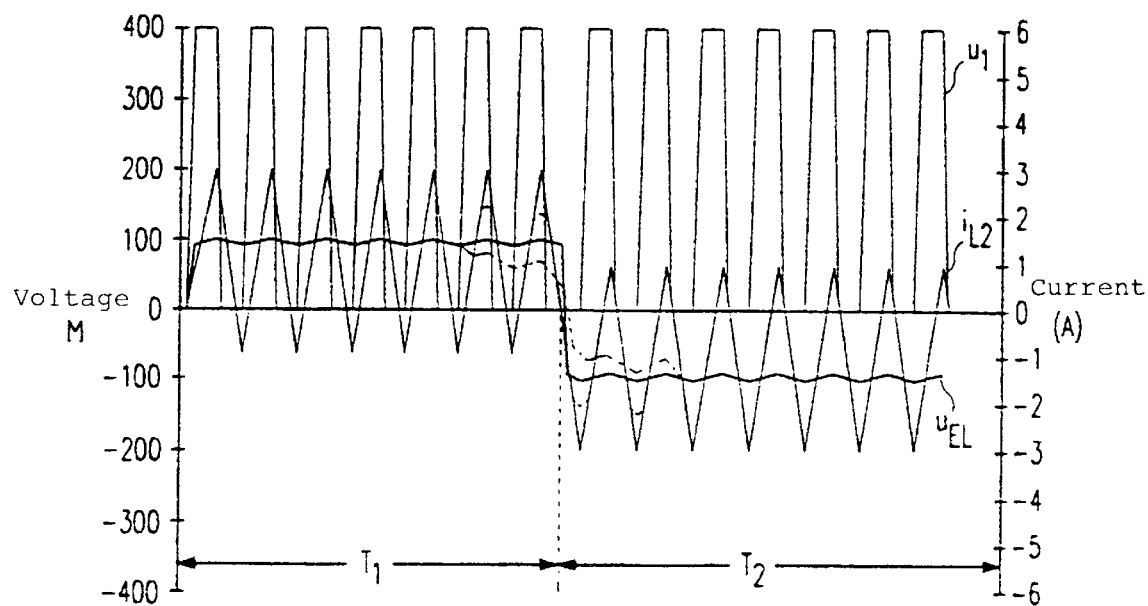
FIG. 2a shows a first graph which represents time-dependent voltage and current characteristics in the circuit arrangement shown in FIG. 1.
Figure 2B:
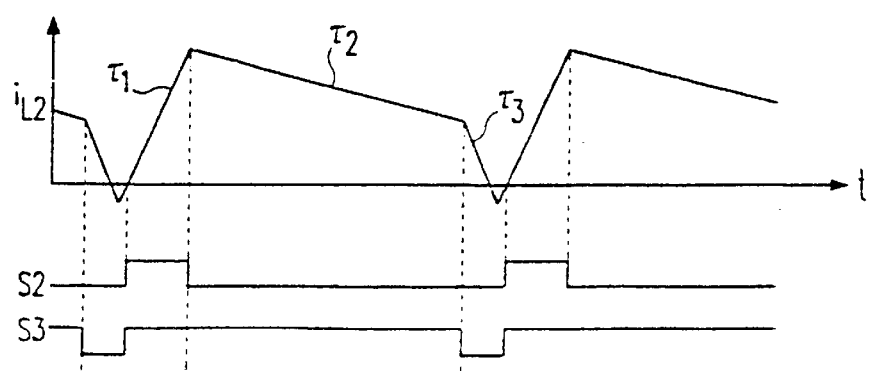
FIG. 2b shows a second graph which represents the time-dependent current characteristic and switching states in the circuit arrangement shown in FIG. 1 in accordance with a further development.

The normal operation of the circuit arrangement shown in FIG. 1 shall be explained in the following with reference to the graph that is shown in FIG. 2, with the characteristic of the voltage $u_1$ that is applied to the nodal point between the switches S1 and S2, of the lamp voltage $u_{EL}$ and of the current $i_{L2}$ that flows by way of the coil L2 being shown in FIG. 2 as a function of time. In particular in FIG. 2 the case is shown where during a first time span $T_1$ of the circuit arrangement shown in FIG. 1 the bridge diagonal with the switches S2 and S3 is activated, whilst during a subsequent time span T2 the bridge diagonal with the switches S1 and S4 is activated. This means that during the time span T1, the switch S3 is permanently closed and the switches S1 and S4 are permanently open. Furthermore, during this time span T1 the switch S2 is switched on and off alternately at a high frequency. It can be seen in particular from FIG. 2 that the switch S2 is continuously closed when the current $i_{L2}$ flowing by way of the coil L2 has reached its lower reversal point, that is, its minimum value, so that the pulse-like characteristic of the voltage $u_1$ results. The steepness of the edges of the current $i_{L2}$ is determined by the inductance of the coil L2. By changing the peak value of the current $i_{L2}$, that is, the time at which the switch S2 opens, the mean current value of the current $i_{L2}$ can be changed and thus the power supplied to the lamp EL and its colour temperature can be regulated or kept constant. The high-frequency characteristic of the current $i_{L2}$ is smoothed by the components L2 and C2 so that the smoothed characteristic of the voltage $u_{EL}$ that is applied to the gas discharge lamp EL and which is shown in FIG. 2 results.

At the end of the time span $T_1$, the switches S2 and S3 are permanently open and the switch S4 is permanently switched on. Analogously to the switch S2 during the time span T1, the switch S1 is now switched on and off alternately at a high frequency so that the characteristic of the voltages $u_1$ and $u_{EL}$ and also of the current $i_{L2}$, shown in FIG. 2, results. As has already been mentioned, with the aid of a control circuit repeatedly there is a switch-over between the operating phases during the time spans T1 and T2, in which case this polarity-reversal frequency can lie in the range of 80–150 Hz, whilst the high-frequency clock frequency of the switch S2 (during the time span $T_1$) or of the switch S1 (during the time span $T_2$) can lie in the region of 45 kHz.

As a result of the low-frequency switch-over or polarity-reversal between the bridge diagonals S1–S4 and S2–S3, a humming noise inevitably develops which on account of its low frequency is comparatively quiet per se and not disturbing. As a result of the steep edges at the switch-over instant between the time spans $T_1$ and $T_2$, however, harmonics develop that do have disturbing effects. For this reason, the control circuit, which activates the switches S1–S4, is to be configured advantageously in such a way that it reduces the current peaks of the current $i_{L2}$ before and after the switch-over between the operating phases $T_1$ and $T_2$. This can be effected, for example, by means of special software or by means of special adaptation of the hardware of the control circuit that reduces the last current peaks during the time span $T_1$ and also the first current peaks during the time span $T_2$ in order in this way to flatten out the edges when there is a switch-over between the operating phases $T_1$, and $T_2$. In this case, the characteristic of the current $i_{L2}$ or of the lamp voltage $u_{EL}$ that is shown in broken lines in FIG. 2 results. It can be seen from the representation in broken lines that before and after the switch-over time the current peaks are reduced slightly in relation to the original characteristic and thus a somewhat smoother transition of the lamp voltage $u_{EL}$ is attained.

In the case of the control which has just been described, after the switch that is switched at a high frequency has been opened the current runs on by way of the free-wheeling diode and thereby decreases comparatively slowly if the second switch of the bridge diagonals which have just been activated remains closed. This results in a smaller current-peak value and accordingly also in a smaller power loss. It can, however, be that at an instant at which the electrons have been cleared out of the barrier layers of the free-wheeling diodes and thus the lower reversal point of the current $i_{L2}$ has been reached the latter will not yet have dropped sufficiently and thus the switches are still subject to a high level of loading upon closure. In order to preclude these loads, in a further development the switches can be controlled in accordance with the graph in FIG. 2b.

This graph shows the current characteristic $i_{L2}$ and the state of the second and the third switch 2, 3 during the time span $T_1$. The two other switches are open during this period of time $T_1$. During a first phase $\tau_1$ both switches are closed and the current $i_{L2}$ rises continuously. As in the case of the control which has just been described, during a second phase $\tau_2$, the beginning of which can be determined by the attainment of a maximum value of $i_{L2}$ or by a predetermined length of $\tau_1$ the second switch is opened and $i_{L2}$ slowly decreases. In addition though from a predetermined time after the second switch S2 has been opened in a third phase $\tau_3$ the third switch S3 is also opened. The current now flows by way of the two free-wheeling diodes of the first and of the fourth switch and now decreases to a greater extent than during the second phase $\tau_2$. It can therefore be guaranteed that $i_{L2}$ also actually attains a negative value before the barrier layers of the free-wheeling diodes are cleared. If $i_{L2}$ reaches the lower reversal point, both switches are closed again and the control is again in the state of the first phase $\tau_1$.

Opening the third switch S3—that is, the third phase $\tau_3$—is not applicable though if the current $i_{L2}$ has already previously dropped to zero, since in this case no high loads occur when switches are opened. Instead, the procedure continues immediately with the first phase $\tau_1$ and the second switch S2 is opened again. The switch-over at a low frequency between the two bridge diagonals is effected in a manner analogous to that in the previous exemplary embodiment, in which case here as well advantageously it is possible to reduce the current peaks of the current $i_{L2}$ before and after the switch-over between the operating phases $T_1$ and $T_2$.

A known property of high-pressure gas discharge lamps is that they behave in a manner that is comparatively difficult to control and in an unstable manner until they have been fully heated. The full rise in temperature thereby occurs after approximately 1–2 minutes. In the warm-up phase the voltage across the lamp can be less than during normal operation. If, during the warm-up phase, the ballast were operated as in the normal operation previously described, the reduced lamp voltage would result in a current $i_{L2}$ flowing by way of the inductor L2 with correspondingly less steepness $di_{L2}/dt$ so that, if applicable, it is not possible to detect the reversal point of $i_{L2}$ reliably by tapping in the manner of a transformer as previously mentioned. It is therefore advantageous to clock the switches S3 and S4 as well analogously to the switches S1 and S2 at a high frequency during the warm-up phase, that is, after the ignition and before the actual normal operation, thereby switching over at a low frequency between the bridge diagonals S1–S4 and S2–S3, that is, there is a switch-over at a low frequency between two states, in which case in the first state the switches S1 and S4 are clocked at a high frequency and the switches S2 and S3 are open, whilst in the second state the switches S2 and S3 are clocked at a high frequency and the switches S1 and S4 are open. As a result of this measure, even by way of the free-wheeling diodes of the switches S4 and S1 a current flows by way of the coil L2, whereby a higher voltage is generated in the winding that is not shown in FIG. 1 and which is coupled in the manner of a transformer to this coil L2 and which is provided in order to detect the reversal point of the current $i_{L2}$ so that reliable detection or monitoring of the current $i_{L2}$ is possible. In particular, the switch-over time can be monitored in an exact manner. The change from the warm-up phase to normal operation occurs after the operating temperature of the lamp has been reached, for example after a threshold (approximately 45V) has been exceeded by the lamp voltage, in which case it is preferable to wait a specific period of time still before actually switching over.

Figure 3:
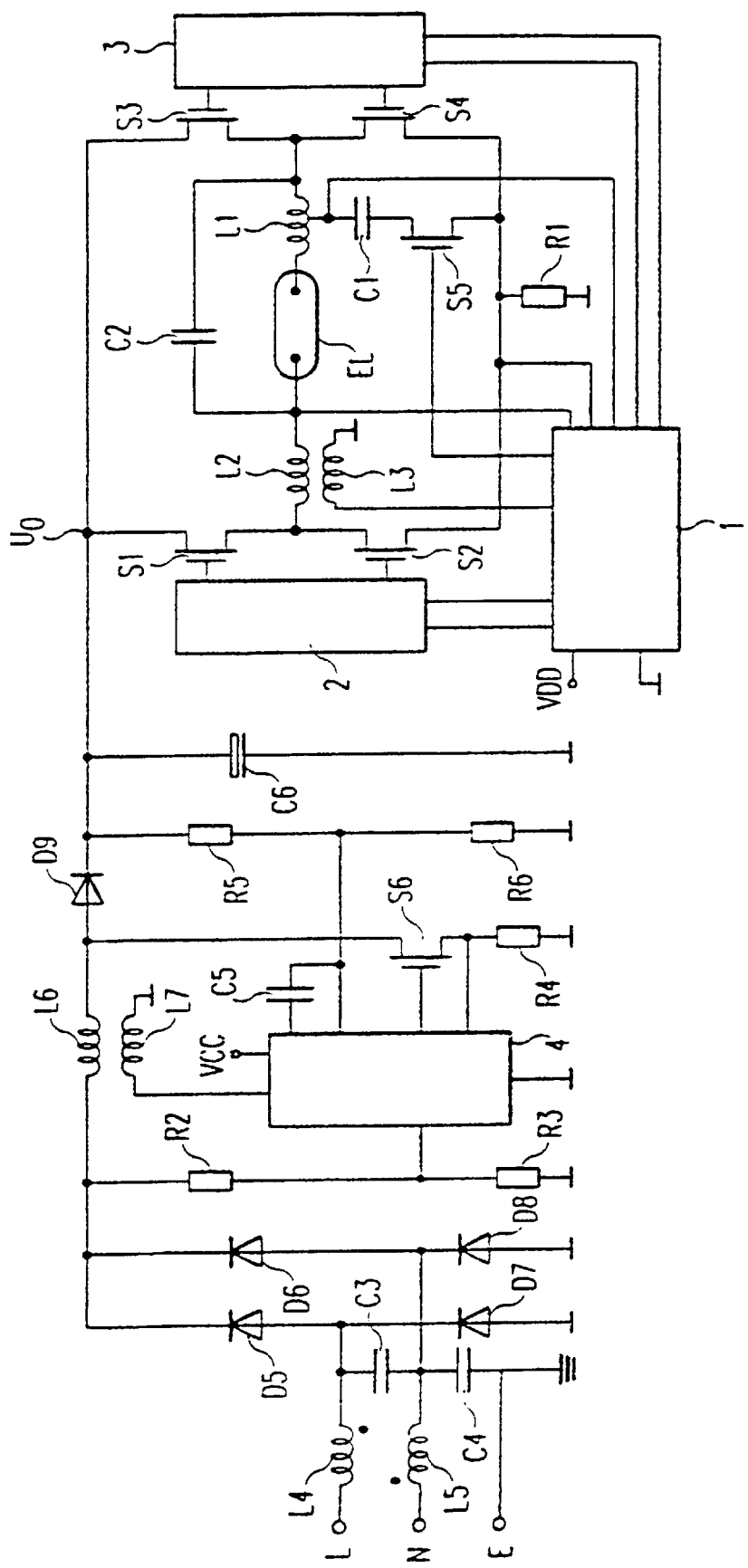
FIG. 3 shows an electronic ballast in which the circuit arrangement shown in FIG. 1 is used.
Figure 4:
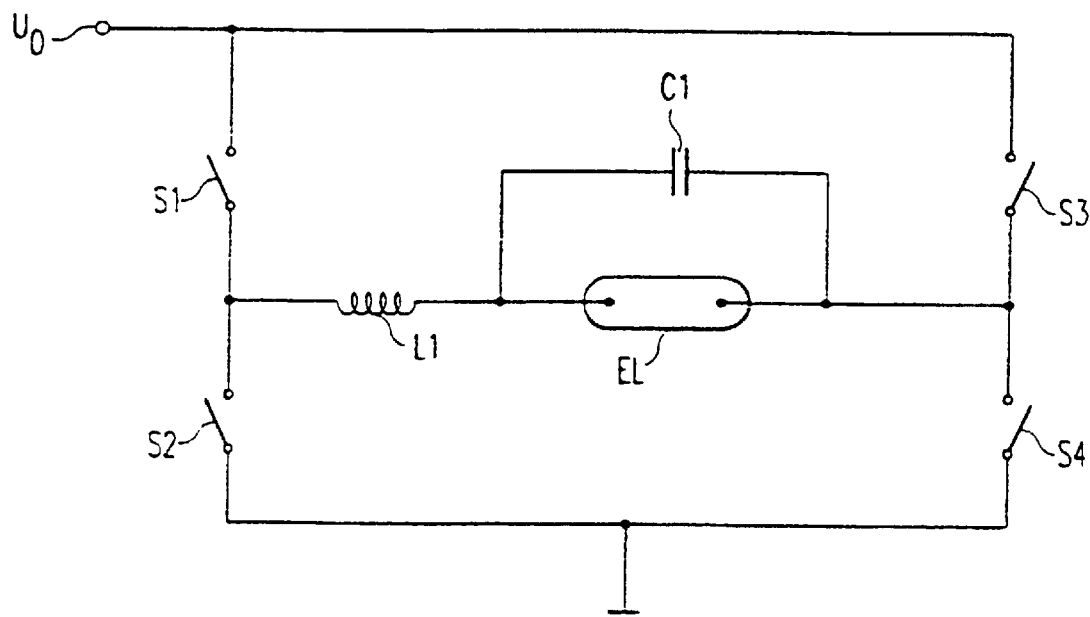
FIG. 4 shows a circuit arrangement in accordance with the known prior art.
Figure 5:
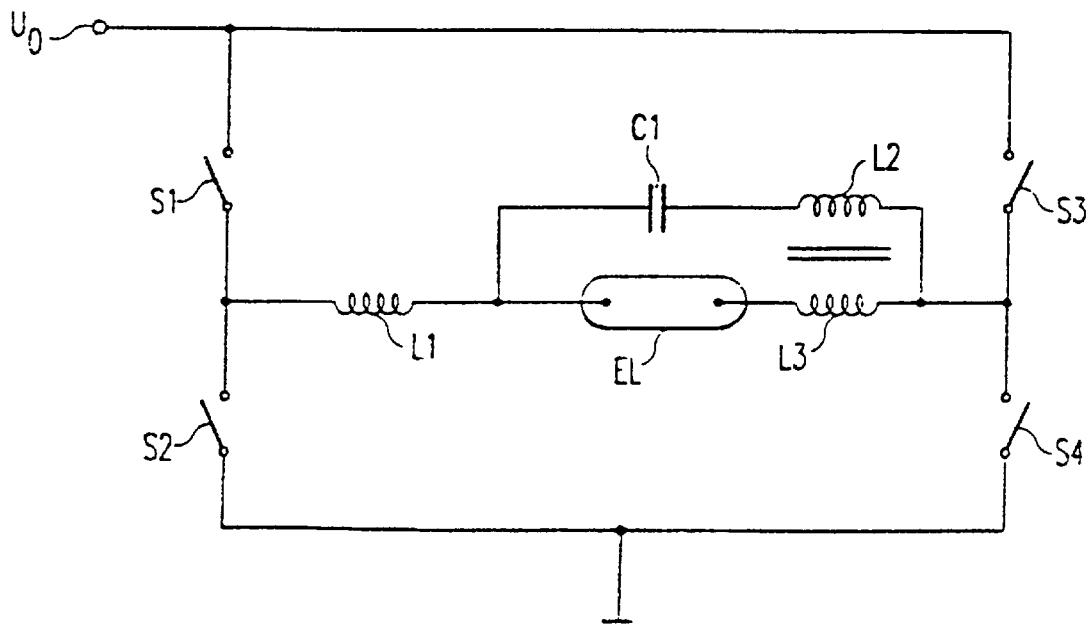
FIG. 5 shows a further circuit arrangement in accordance with the known prior art.

FIG. 3 shows the use of the circuit arrangement shown in FIG. 1 in accordance with the present invention in an electronic ballast for operating gas discharge lamps, in particular high-pressure gas discharge lamps. On the input side the electronic ballast has a radio-interference suppressor filter with a balance-to-unbalance transformer L4, L5 and also capacitors C3 and C4 which are connected to a current-carrying conductor L, a neutral conductor and a ground conductor of a supply-voltage system. Connected to the radio-interference suppressor filter there is a rectifier that comprises diodes D5–D8. Connected to this rectifier there is a circuit which functions as a step-up converter and has resistors R2–R6, capacitors C5 and C6, a diode D9, a transformer L6, L7, a field-effect transistor S6 and also an integrated control circuit 4 that is supplied by a supply voltage VCC and which activates in particular the field-effect transistor S6, serving as a switch, with the aid of a pulse-width modulated signal as a function of the voltage that is tapped at the resistor R3. In this way, as a result the times at which the transistor S6 is conductive are controlled during a system half-wave in such a way that the envelope curve of the current that is taken up is substantially sinusoidal. This output voltage is rectified with the aid of the diode D9 and filtered with the aid of the capacitor C6 so that the d.c. supply voltage $U_0$, which has already been explained with the aid of FIG. 1, is made available for the circuit arrangement provided to operate the gas discharge lamp EL. On the output side the electronic ballast shown in FIG. 3 comprises the circuit arrangement shown in FIG. 1, in which case corresponding components are provided with identical reference symbols so that it is possible to dispense with a repetition of the description of these components. It is, however, to be additionally noted that also shown in FIG. 3 is the winding L3 that has already previously been mentioned and which is coupled in the manner of a transformer to the inductor L2 located in the bridge branch of the full bridge and which is used to detect the reversal point of the current $i_{L2}$ (cf. FIG. 1). Furthermore, the central control circuit 1 is shown in FIG. 3, which control circuit 1 is fed by a supply voltage VDD and, on the one hand, with the aid of the coil L3 detects the reversal point of the current $i_{L2}$ and, on the other hand, with the aid of the voltage that is tapped at the resistor R1 detects the instantaneous level of the current $i_{L2}$. Furthermore, this control circuit 1, which can be configured in particular as an application-specific integrated circuit (ASIC), monitors the voltage that is applied to the tapping point of the coil L1 of the series resonant circuit and with the aid of which the ignition of the gas discharge lamp EL can be detected. The outputs of the control circuit 1 are coupled to bridge drivers 2 and 3 which are used to activate the field-effect transistors S1 and S2 or S3 and S4 respectively. The field-effect transistor S5 that is also used as a switch and which is connected in series with the resonant circuit capacitor C1 is activated directly by the control circuit 1.

What is claimed is:

1. A circuit for operating a gas discharge lamp comprising:

four controllable switches arranged in a full bridge circuit, to which a direct voltage has been applied; in which a first of said switches being connected in series with a second of said switches, and a third of said switches being connected in series with a fourth of said switches, said first switch being connected to said third switch, and said second switch being connected to said fourth switch, said full bridge circuit having a bridge branch in which a gas discharge lamp can be connected, said bridge branch connecting a nodal point between said first switch and said second switch to a nodal point between said third switch and said fourth switch, and a control circuit which for normal operation of the gas discharge lamp alternately switches between a first and a second state at a first frequency, in which case during said first state causes said first and fourth switches to be open, said second switch to be switched on and off alternately at a second frequency which is higher than said first frequency, and said third switch to be closed at least when said second switch is also closed, and in which case during said second state causes said second and third switches to be open, said first switch to be switched on and off alternately at said second frequency, and said fourth switch to be closed at least when said first switch is also closed, said control circuit being constructed and arranged to monitor a branch current flowing in said bridge branch and during said first state to close said second switch, or in said second state to close said first switch whenever said branch current is at a minimum value.

2. Circuit arrangement according to claim 1, wherein:
   in the first state said third switch remains closed and in said second state said fourth switch remains permanently closed.

3. Circuit arrangement according to claim 1, wherein:
   said control circuit in said first state after a predetermined period of time after the opening of said second switch also opens said third switch and in said second state after a predetermined period of time after the opening of said first switch also opens said fourth switch when a branch current has not yet dropped to zero.

4. Circuit arrangement according to claim 1, wherein:
   said control circuit in said first state opens said second switch again in said second state opens said first switch again at the end of a predetermined time span or when a maximum value of said branch current is exceeded.

5. Circuit arrangement according to claim 1, wherein:
   a resistor is coupled to said full bridge;
   said control circuit detects the level of said branch current by measuring a voltage drop across said resistor wherein;
   first and second coils are arranged in said bridge circuit, and wherein;

said control circuit detects a reversal point of a branch current that corresponds to a minimum value by monitoring a voltage that drops across said first coil.

6. Circuit arrangement according to claim 1, wherein:

said control circuit is configured to reduce current peaks in said branch current upon switchover between said first state and said second state.

7. Circuit arrangement according to claim 6, wherein:

said control circuit is a microcontroller which is programmed to reduce current peaks of said branch current that occur before and after switch-over between said first and said second state.

8. Circuit arrangement according to claim 6, wherein:

said control circuit is configured as an ASIC to reduce current peaks of said branch current that occur before and after switchover between said first state and said second state.

9. Circuit arrangement according to claim 1, wherein:

said control circuit is configured to effect a warm-up phase of said gas discharge lamp before normal operation of said gas discharge lamp, with said control circuit during said warm-up phase alternately switching said first switch and said second switch on and off and to switch said second switch and said third switch in a manner complementary thereto at the first frequency.

10. Circuit arrangement according to claim 1, wherein:

said control circuit is configured to carry out before normal operation of said gas discharge lamp, an igniting operation is carried out in order to ignite the gas discharge lamp, said control circuit during the igniting operation opening said first switch and said second switch and switching said third switch and said fourth switch on and off alternately at a frequency that substantially corresponds to the resonant frequency of said series resonant circuit coupled to the gas discharge lamp.

11. Circuit arrangement according to claim 10, wherein:

said control circuit is configured to switch said third switch and said fourth switch on and off firstly at a higher frequency than the resonant frequency of said series resonant circuit during said igniting operation and subsequently lowers said higher frequency in the direction of the resonant frequency of said series resonant circuit.

12. Circuit arrangement according to claim 10, wherein:

said control circuit is configured to detect ignition of said gas discharge lamp and after said detection to switch over from the igniting operation to a warm-up operation.

13. Circuit arrangement according to claim 11, wherein:

said control circuit is configured to switch over from said warm-up operation to normal operation after heating said gas discharge lamp to a predetermined operating temperature.

14. Circuit arrangement according to claim 12, wherein:

said control circuit is configured to detect said ignition voltage or a condition corresponding thereto.

15. Circuit arrangement according to claim 14, wherein:

said series resonant circuit comprises an inductor connected into said bridge branch, and a capacitor connected to a tapping point of said inductor to act on said bridge branch at said tapping point.

16. Circuit arrangement according to claim 15, wherein:

said control circuit is arranged to detect the voltage that drops across said tapping point between said capacitor and said inductor in order to detect the ignition of said gas discharge lamp.

17. Circuit arrangement according to claim 15, wherein:

said capacitor of said series resonant circuit is connected in series with a fifth controllable switch and, by way of said inductor of said series resonant circuit, in parallel with said fourth switch, said control circuit being arranged to control said fifth switch during said igniting operation and after identification of the ignition of said gas discharge lamp for opening said fifth switch for the warm-up operation or normal operation of said gas discharge lamp.

18. Circuit arrangement according to claim 15, wherein:

said inductor of said series resonant circuit is so dimensioned that it operates at a saturation point during normal operation, whereby said inductor of said series resonant circuit establishes negligible inductance during normal operation.

19. Circuit arrangement according to claim 18, wherein:

said inductor of said series resonant circuit comprises a coil with an iron core that is saturated during normal operation.

20. Circuit arrangement according to claim 1, wherein:

a smoothing circuit is coupled to the bridge branch of said full bridge that substantially only an a.c. component at said lower first frequency is applied to said gas discharge lamp.

21. Circuit arrangement according to claim 20, wherein:

said smoothing circuit comprises a coil arranged in series with said gas discharge lamp in said bridge branch and a capacitor connected in parallel with said gas discharge lamp.

22. Circuit arrangement according to claim 21, wherein:

said control circuit is connected to detect a level of said branch current by measuring a voltage that drops across a resistor coupled to said full bridge; and wherein said control circuit is arranged to detect a reversal point of said branch current that corresponds to the minimum value by monitoring a voltage that drops across a further coil, said further coil being coupled to the coil of said-smoothing circuit arranged in said bridge branch.

23. Circuit arrangement according to claim 1, wherein:

said controllable switches of said full-bridge circuit are field-effect transistors which have a free wheeling diode characteristic.

24. Circuit arrangement according to claim 1, wherein:

said circuit arrangement is capable of operating a high-pressure gas discharge lamp.

25. Circuit arrangement according to claim 1, wherein:

said first frequency lies in the range of 80–150 Hz and said second frequency lies at approximately 45 kHz.

26. Circuit arrangement for operating a gas discharge lamp, said circuit arrangement comprising:

a full-bridge circuit arranged to receive a direct voltage, said bridge circuit comprising four controllable switches including a first switch connected in series with a second switch, and a third switch connected in series with a fourth switch, said first switch being connected to said third switch, and said second switch being connected to said fourth switch and a bridge branch which connects a nodal point between said first switch and said second switch to a nodal point between said third switch and said fourth switch said bridge circuit being arranged to accommodate a gas discharge lamp; and a control circuit configured to carry out, before normal operation of the gas discharge lamp a warm-up operation in order to warm up said gas discharge lamp;

said control circuit being configured such that during said warm-up phase, it alternately switches over between a first and a second state at a first frequency, in which case during said first state said first and said fourth switch are open and said second switch and said third switch are switched on and off at the same time together at a second frequency that is higher than said first frequency, and, during said second state said second switch and said third switch are open and said first switch and said fourth switch are switched on and off at the same time together at said second frequency.

27. Circuit arrangement according to claim 26, wherein:

said control circuit is configured such that, during said warm-up operation said control circuit switches said first switch and said fourth switch and, in a complementary manner thereto, switches over said second switch and said third switch at said first frequency, said first frequency being of an order of magnitude of the operating frequency at which, during normal operation, said circuit arrangement switches over between said first switch and said fourth switch and said second switch and said third switch on the other hand.

28. Circuit arrangement according to claim 27, wherein:

said control circuit switches over alternately between said first state and said second state approximately 80–150 Hz during its warm up operation.

29. Circuit arrangement for operating a gas discharge lamp, comprising:

a full-bridge circuit arranged to receive a direct voltage, said full-bridge circuit including:

a first switch connected in series with a second switch, and a third switch connected in series with a fourth switch, said first switch also being connected to said third switch, and said second switch being connected to said fourth switch, and a bridge branch which connects a nodal point between said first switch and said second switch to a nodal point between said third switch and said fourth switch, said bridge branch being arranged to accommodate a gas discharge lamp;

a series resonant circuit coupled to said bridge branch; and a control circuit arranged to cause ignition of the gas discharge lamp in said bridge branch before normal operation of said gas discharge lamp, said control circuit being operative, during the operation of causing ignition, to operate said full bridge at a frequency that lies close to the resonant frequency of said series resonant circuit that is coupled to the bridge branch of the full bridge, said control circuit being configured such that during the igniting operation it opens said first switch and said second switch and switches said third switch and said fourth switch on and off alternately at the frequency that lies close to the resonant frequency of said series resonant circuit.

30. Circuit arrangement according to claim 29, wherein:

said control circuit is configured to switch said third switch and said fourth switch on and off alternately firstly at a higher frequency than the resonant frequency of said series resonant circuit and subsequently lowers this frequency in the direction of the resonant frequency.

31. Circuit arrangement according to claim 30, wherein:

said control circuit is configured to detect a voltage that is applied to said gas discharge lamp or a variable dependent thereon in order to identify the ignition of said gas discharge lamp.

32. Circuit arrangement according to claim 31, wherein:

said series resonant circuit comprises an inductor which is connected into said bridge branch and a capacitor connected to a tapping point of said inductor, said control circuit being arranged to detect a voltage drop across said tapping point in order to identify ignition of said gas discharge lamp.

33. Circuit arrangement according to claim 32, wherein:

said capacitor of said series resonant circuit is connected in series with a fifth controllable switch and, by way of said inductor, is connected in parallel with said fourth controllable switch, said control circuit being arranged to close said fifth switch during the igniting operation and after identification of ignition of said gas discharge lamp, to open said fifth switch and to initiate a warm-up operation or normal operation of said circuit arrangement.

* * * * *